A. J. CURRIE.
HORSESHOE CALK.
APPLICATION FILED JAN. 29, 1915.
1,178,841.
Patented Apr. 11, 1916.
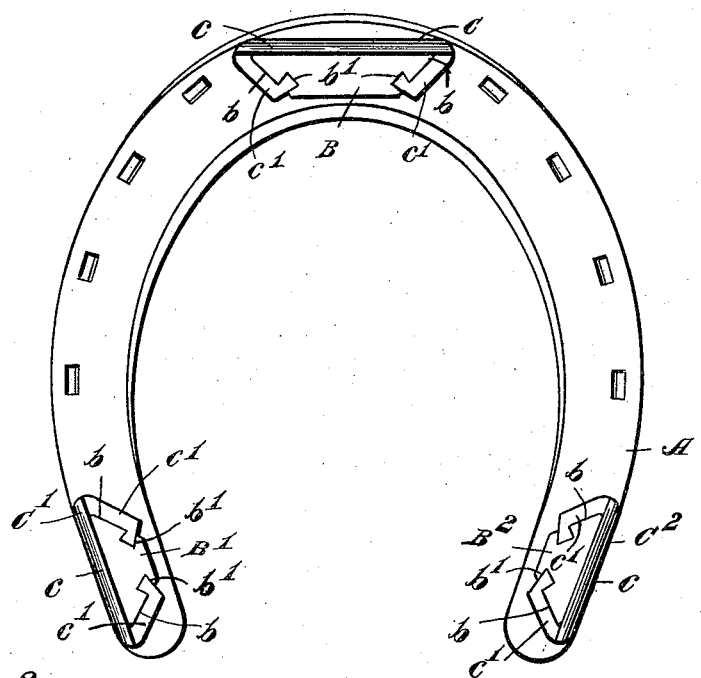
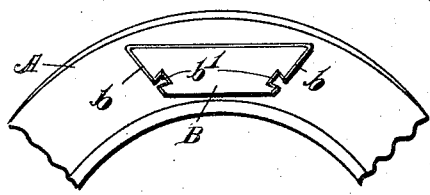
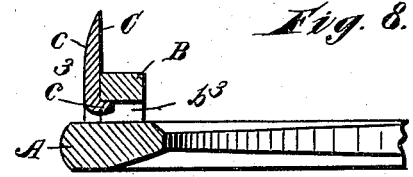
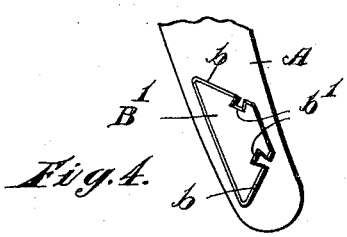
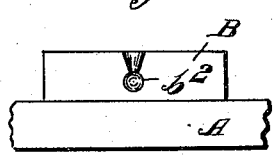
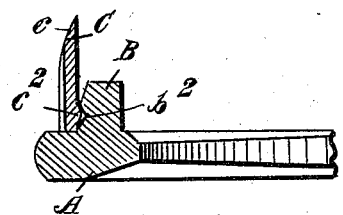
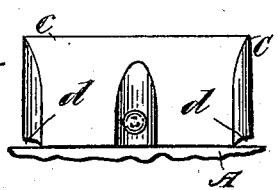
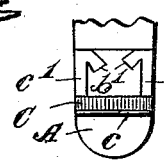
WITNESSES:
Sudger A. Nicol
Herbert E. Sunbury
INVENTOR:
Alexander John Currie,
BY Albert M. Moore,
His ATTORNEY.
THE COLUMBIA PLANOGRAPH CO., WASHINGTON, D. C.

UNITED STATES PATENT OFFICE.

ALEXANDER JOHN CURRIE, OF LOWELL, MASSACHUSETTS.

HORSESHOE-CALK.

1,178,841.  Specification of Letters Patent.  Patented Apr. 11, 1916.

Application filed January 29, 1915. Serial No. 5,007.

*To all whom it may concern:*

Be it known that I, ALEXANDER JOHN CURRIE, a citizen of the United States, residing at Lowell, in the county of Middlesex and Commonwealth of Massachusetts, have invented a certain new and useful Improvement in Horseshoe-Calks, of which the following is a specification.

This invention relates to horseshoe calks, its object being to provide a calk which may be easily and firmly secured to the shoe and readily removed therefrom when desired, without the use of rivets, bolts, screws, keys, or similar fastenings which are liable to rust and breakage and most of which require the use of proper tools. Such fastening devices are usually small and difficult to handle with cold fingers and in winter weather when removable calks are most in demand and besides being difficult to put in place, are, when rusted and frosty, almost impossible to remove without breaking. Screws used for such purposes are frequently broken within the calk, requiring the horse with a broken calk to be taken to a horseshoer for removal of the broken screw, with increased danger of the horse slipping and falling on the way, and of cutting himself by the inner heel-calk if the outer heel-calk be the one broken. The shoe, in this case, must be removed and usually heated to remove the broken calk, recalked and re-set.

The calk herein described consists of a single removable piece and a solid calk or base permanently attached to the shoe, these calks being each adapted to enter and receive the other.

In the accompanying drawing Figure 1 is a reverse plan of a horseshoe provided with my improved calks; Fig. 2, a reverse plan of the toe-portion of a horseshoe, omitting the removable calk; Fig. 3, a reverse plan of a heel-calk and the heel portion of the plate, showing the calk arranged transversely of the plate; Fig. 4, is a reverse plan of a permanent or solid heel-calk and the adjacent part of the plate; Fig. 5, a front elevation of the stationary calk adapted to engage the removable calk shown in Figs. 6 and 7; Fig. 6, a central section similar to what is shown in Fig. 3 but showing a different means of locking the removable calk to the permanent calk; Fig. 7, a front elevation of the removable calk shown in Fig. 6; Fig. 8, a central section of the plate and toe-calk showing another means of securing the removable calk.

A is the plate or body of a horseshoe of usual construction, except as hereinafter stated. To the bottom of the plate are permanently secured or formed integral therewith downward projections B $B^1$ $B^2$ or solid calks, intended to engage and support removable calks C $C^1$ $C^2$. These projections B $B^1$ $B^2$, or solid calks, may be used as summer calks or dull calks, that is, for use on unfrozen ground. The removable calks are represented as having sharp edges but may be used after the edges are worn blunt or may be replaced by other removable calks having dull edges for summer use or use where sharp calks are unnecessary. The solid calks B $B^1$ $B^2$ are each represented as downwardly tapering (Figs. 2 and 4) and having ends $b$ which converge inwardly or toward the central opening of the plate A and also as provided with outwardly-inclined end-slots $b^1$ which are preferably of dove-tail shape or larger at their inner ends as shown in (Figs. 1, 2 and 4).

Each removable calk C $C^1$ $C^2$ has an outer vertical plate $c$ and wings $c^1$ which are shaped to fit the outer face of the solid calk, the ends of said wings entering and fitting the end-slots $b^1$, that is, being enlarged into dovetails which prevent their being drawn longitudinally out of said slots and making it impossible to disengage the removable calks from the solid calks except by forcing the removable calks perpendicularly away from the plate A. Inasmuch as the solid calks are downwardly tapering and the removable calks are internally downwardly tapering and fit the solid calks it requires a considerable force to separate them and I have cut away the upper outer surfaces of the ends of the removable calks to leave spaces $d$ to receive the point of a cold chisel with a single bevel or similar prying tool, when such removal becomes necessary. The corresponding tapers of each pair of calks are very slight and the friction between the parts is very great so that the accidental separation of the calks is almost impossible, but I have provided (Figs. 5, 6, 7) an additional safeguard against such separation, by making a recess or depression $b^2$ in one of the contacting outer faces of one of the calks of a pair and a projection $c^2$ in the corresponding face of the other calk. So that when the removable calk is being forced down over the solid calk against the plate A, the former will be sprung outward until the projection $c^2$ is in alinement with the depression $b^2$ when said projection will seat itself in said depression. Another means of securing the calks of a pair from accidental separation is shown in Fig. 8, where one calk is provided with a tongue $c^3$ which is driven by a punch into a horizontal hole $b^3$ in the other calk of the pair and is driven by a similar punch out of said hole when it is desired to remove the sharp calk.

The toe-calk is like the heel-calk in construction but usually longer, as represented in Fig. 1. The heel-calk shown in Fig. 3 is like those shown in Fig. 1 but is placed transversely of the plate A.

I claim as my invention:

1. The combination of a horseshoe, provided with a permanent calk, having outwardly-inclined end-slots, and a removable calk adapted to fit the outer face and ends of said permanent calk and to engage said end-slots.

2. The combination of a horseshoe, provided with a permanent calk having outwardly diverging ends and with outwardly-inclined end-slots, and a removable calk adapted to fit the outer face and ends of said permanent calk and to engage said end-slots.

3. The combination of a horseshoe, provided with a permanent calk having upwardly and outwardly diverging ends and having inclined end-slots, and a removable calk adapted to fit the outer face and ends of said calk and to engage said end-slots.

4. The combination of a horse shoe, provided with a downwardly tapering permanent calk and a removable calk internally downwardly tapering and adapted to fit said permanent calk and to be retained thereon by friction.

5. The combination of a horseshoe, provided with a downwardly tapering permanent calk and a removable calk internally-downwardly tapering and adapted to fit said permanent calk, the ends of said permanent calk being provided with end-slots and said removable calk being provided with dovetails adapted to enter and fit said slots.

6. The combination of a horseshoe, provided with a permanent calk and a removable calk adapted to receive said permanent calk and to be retained thereon by friction one of said calks being provided with a depression and the other of said calks being provided with a projection adapted to enter said depression, to prevent the accidental separation of said calks.

7. The combination of a horseshoe, provided with a permanent calk and a removable calk adapted to receive said permanent calk and to be retained thereon by friction, one of said calks being provided with a depression and the other of said calks being provided with a projection adapted to enter said depression, to prevent the accidental separation of said calks, said removable calk being thinner opposite said projection and depression to allow said last named calk to spring away from the permanent calk until said projection enters said depression.

8. The combination of a horseshoe, provided with a downwardly tapering permanent calk, and a removable calk internally downwardly tapering and adapted to fit said permanent calk and to be retained thereon by friction, one of the said calks being provided with a depression and the other of said calks being provided with a projection adapted to enter said depression, to prevent the accidental separation of said calks.

9. The combination of a horseshoe, provided with a downwardly tapering permanent calk, and a removable calk internally downwardly tapering and adapted to fit said permanent calk and to be retained thereon by friction, one of said calks being provided with a depression and the other of said calks having a projection adapted to enter said depression, to prevent the accidental separation of said calks, said removable calks being thinner opposite said projection and depression to allow said last named calk to spring away from said permanent calk until said projection enters said depression.

In witness whereof, I have affixed my signature in presence of two witnesses.

ALEXANDER JOHN CURRIE.

Witnesses:
 ALBERT M. MOORE,
 BERNARD F. GATELY.

Copies of this patent may be obtained for five cents each, by addressing the "Commissioner of Patents, Washington, D. C."